United States Patent [19]

Strecker

[11] Patent Number: 4,765,745
[45] Date of Patent: Aug. 23, 1988

[54] APPARATUS FOR DOSING AND MIXING SOLIDS AND LIQUIDS TO FORM A LOW VISCOSITY SUSPENSION

[75] Inventor: Jürgen Strecker, Stuttgart, Fed. Rep. of Germany

[73] Assignee: Werner & Pfleiderer, Fed. Rep. of Germany

[21] Appl. No.: 3,201

[22] Filed: Jan. 14, 1987

Related U.S. Application Data

[63] Continuation-in-part of Ser. No. 730,312, May 2, 1985, abandoned.

[30] Foreign Application Priority Data

Jun. 22, 1984 [DE] Fed. Rep. of Germany ....... 3423058

[51] Int. Cl.⁴ .............................................. B29B 5/00
[52] U.S. Cl. ........................................ 366/76; 366/86
[58] Field of Search ................... 366/84, 83, 85, 86, 366/87, 91, 141, 292, 96, 97, 155, 156, 158, 76; 425/207, 208

[56] References Cited

U.S. PATENT DOCUMENTS

| 2,877,524 | 3/1959 | Bishop | 366/141 |
| 3,873,072 | 3/1975 | Blackmon | 366/86 |
| 4,212,543 | 7/1980 | Bersano | 366/86 |
| 4,534,652 | 8/1985 | Stade | 366/85 |

Primary Examiner—Robert W. Jenkins
Attorney, Agent, or Firm—Laff, Whitesel, Conte & Saret

[57] ABSTRACT

An apparatus and a method for dosing and mixing solids and liquids to form a low viscosity suspension comprises at least one continuously operating mixing device and a supply device for supplying the components to the mixing device, in order to obtain a desired initial pressure. The supply device is constructed as a drag flow pump (1) which is connected to the mixing device (6) by a pressure pipe (13), at least one solids and liquid introduction device (15, 16 or 17, 18) is provided along the drag flow pump (1) and the latter is followed by at least one liquid introduction device (27), a shut-off device being provided in the pressure pipe (13).

2 Claims, 1 Drawing Sheet

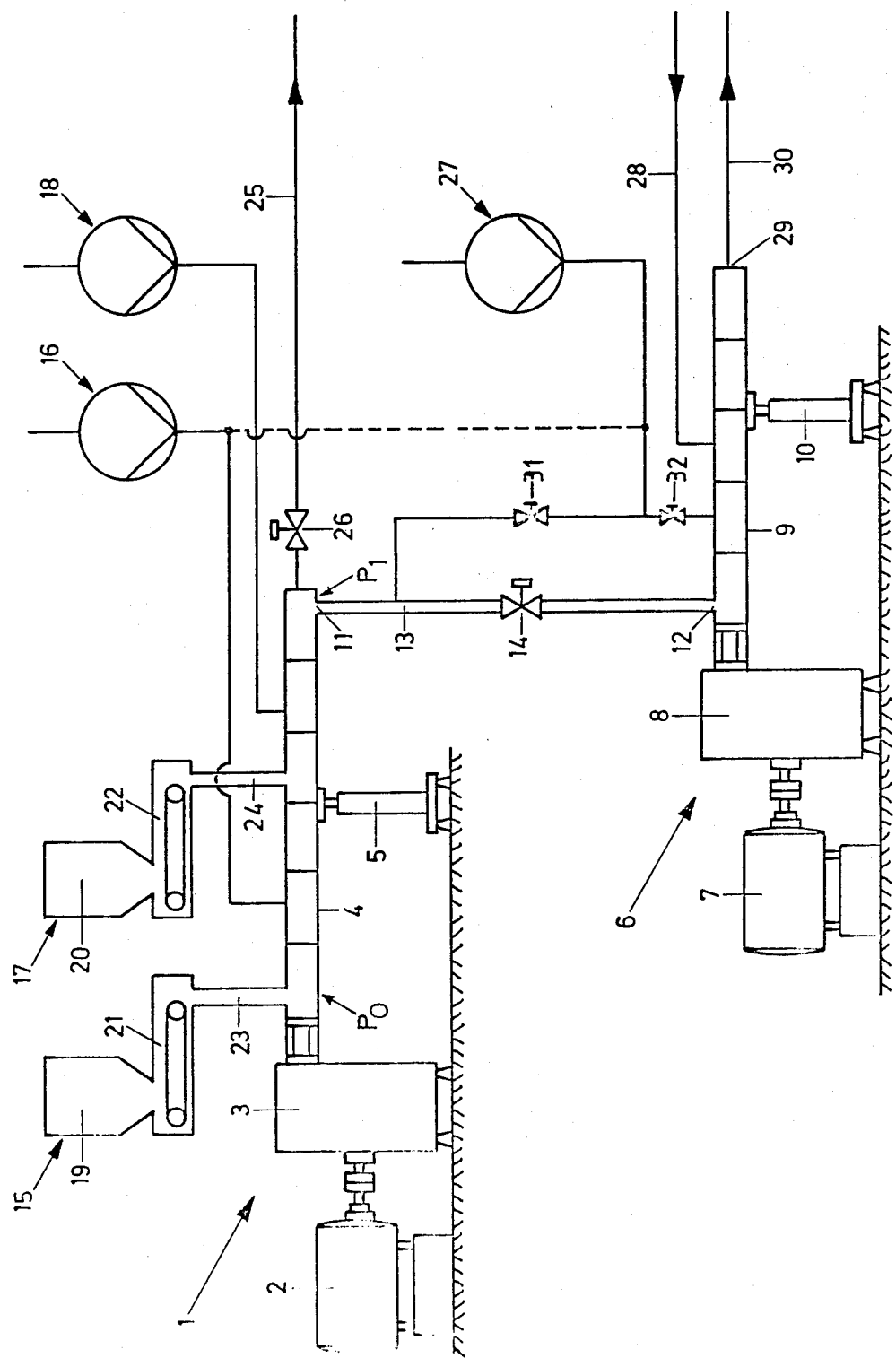

APPARATUS FOR DOSING AND MIXING SOLIDS AND LIQUIDS TO FORM A LOW VISCOSITY SUSPENSION

This is a continuation-in-part of our application 06/730,312 filed on May 2, 1985, now abandoned.

FIELD OF THE INVENTION

This invention relates to an apparatus, method and use of an apparatus for dosing and mixing solids and liquids to give a low viscosity suspension to be fed to a pressurized process line.

Such an apparatus is particularly intended to make it possible to prepare such a suspension using abrasive, pulverulent solids, which is discharged under pressure.

BACKGROUND OF THE INVENTION

For the preparation of such low viscosity suspensions, use is made of axially closed pump systems forming individual chambers, e.g. counter-rotating twin screws, such as screw spindle pumps. Such pumping or mixing systems are able to build up high pressures in the case of very small chamber-casing clearances but, due to their kinematics, lead to a high degree of wear, which on the one hand increases maintenance costs and on the other hand over a period of time leads to a drop in the pressure build-up capacity. When it is necessary to obtain a specific pressure build-up capacity, the mixing and compounding efficiency of such counter-rotating screws is inadequate. In addition, the speeds of counter-rotating screw arrangements are relatively low and consequently so is the attainable throughput, based on the machine size.

Pumps without forced delivery, such as co-rotating screws have a high mixing efficiency and are subject to lower wear, but in the conventional manner cannot be used for building up the starting pressure required for certain processes in the case of low viscosity suspensions, because the pressure build-up capacity of such pumps is dependent on the viscosity of the medium to be delivered, apart from the screw geometry and length.

Solutions with continuously operating mixers and an additional booster pump are irrational and are subject to considerable limitations with regards to the various operating requirements and problems which occur. German Patent Specifications Nos. 972895 and 2850121 disclose the use of screw conveyors for supplying solids by means of such a conveyor to a process which is taking place under pressure. However, due to the consistency of the materials to be supplied, the pressure build-up then constitutes no problem. A gas seal between the conveying means or mixing means and the reaction chamber is achieved by a material plug formed at the end of the screw conveyor, which is continuously ejected into the reaction chamber, where it is dispersed again.

SUMMARY OF THE INVENTION

It is accordingly the object of the present invention to develop an apparatus and a method for dosing and mixing solids and liquids that it has the pressure build-up necessary for introducing a low viscosity suspension into a process zone, whilst permitting a high throughput and maintaining a continuous operating procedure.

According to the invention, there is provided apparatus for dosing and mixing solids and liquids to give a low viscosity suspension comprising at least a frist and a second drag flow pump, said first and second drag flow pumps being arranged in series with a pressure pipe joining said first and second drag flow pumps, a shut-off means being provided in said pressure pipe, and further comprising at least one solid and at least one liquid introduction device being provided along said first drag flow pump for production of a suspension with a comparatively high viscosity necessary for the pressure build-up and at least one remaining-liquid introduction device being provided downstream of the first drag flow pump for production of a suspension of low viscosity, a pressurized process line being arranged downstream said second drag flow pump the pressure in said process line being higher than the initial pressure at the start, each drag flow pump continuously conveying the medium to be conveyed through the dragging effect of a rotor surface wetted by the medium whilst overcoming an external resistance. As a result of the inventive combination of at least two such drag flow pumps, it is possible to achieve the necessary pressure build-up, such as was not conventionally possible, whilst reducing the wear phenomena occurring in forced delivering systems. Through the use of a closed, continuously operating system, the desired operational parameters and measures can be advantageously realised or incorporated. It is therefore possible without difficulty to carry out gassing and degassing, the incorporation of several additives, the planned introduction of energy, heating and cooling, as well as the complete or partial return of the suspension into the system in the case of fluctuating discharge or in the case of faults in following units.

In the first drag flow pump of the supply device, the solids are dosed and homogeneously mixed with a liquid quantity which, for viscosity reasons, is necessary for a desired pressure at the outlet of the drag flow pump. The already pressurized suspension discharged there is supplied to the following second drag flow pump, where further liquid is incorporated until the desired viscosity or composition is obtained. At the outlet of the second drag flow pump, a suspension is then available which has both the desired consistency and the necessary pressure.

The use of an intermeshing co-rotating twin screw pump in the or each drag flow pump is particularly advantageous. However, the invention covers both single-thread and multiple-thread, and both single and twin-shaft screws and, if necessary, those with meshing profiles. Such drag flow pumps continuously convey the medium to be conveyed through the dragging effect of a rotor surface wetted by the medium whilst overcoming an external resistance. The liquid introduction device downstream of the drag flow pump of the supply device issues into the pressure pipe and/or into the second drag flow pump. Part or all the liquid to be additionally added may be injected by nozzles into the pressure pipe instead of into the second drag flow pump. This gives a non-homogeneous premixing with the suspension from the first drag flow pump, so that the pressure loss in said pressure pipe is significantly reduced. There is in fact a smearing on the pressure pipe wall and a reduction in the viscosity of the suspension. Wetting can additionally take place in the pressure pipe and said shut-off device is provided in said pressure pipe which follows switching off of the drag flow pump acting as the supply device. A shut-off device may also be provided at the end of the drag flow pump.

The above-mentioned shut-off devices make it possible to start and stop the feed system against the pressure. In addition, the shut-off device in the pressure pipe has a safety function, because the process pressure is often formed by the gas pressure of flammable, hot and environmentally prejudicial gases, such as e.g. hydrocarbons. These gases must not expand rearwards in an uncontrolled manner through the screw machine, particularly in the case when the upstream gas volume formed by containers, reactors and the like is very large. The shut-off device also ensures that in the case of faults, i.e. interruptions to the solid supply and the resulting prevention of a pressure build-up, that there is no gas break-through. This is also assisted by a material plug between the end of the first drag flow pump and the shut-off device.

The shut-off device at the end of this first drag flow pump makes it possible for this drag flow pump to idle on starting the system.

According to a preferred embodiment of the invention, a plurality of introduction devices are provided along the first and/or the second drag flow pumps. If the drag flow pumps are constituted e.g. by intermeshing co-rotating twin screw machines, then the pressure build-up length starting from the end only represents a few screw diameters i.e. most of the screw is largely pressureless. Thus, over a relatively short back pressure length, the screw is completely full, whereas in most of its working length it is only partially filled. This zone can therefore easily house several introduction devices in succession for solid or liquid components.

According to the invention there is further provided a method for building up a process pressure in a process line leading to a pressurized reaction or process chamber in a suspension of low viscosity comprising at least one solid and one liquid to be fed to this process line comprising the feeding of said solid and a part of said liquid to a first drag flow pump, mixing said solid and said part of said liquid in said first drag flow pump to form a suspension of high viscosity, feeding that suspension of comparatively high viscosity, necessary for the formation of a material plug downstream of said first drag flow pump for the pressure build-up, to a pressure line downstream said first drag flow pump, the pressure of said suspension at the end of said first drag flow pump being as high or somewhat higher than the process pressure in the process line, conveying that suspension of comparatively high viscosity from that pressure line to a second drag flow pump, which is under process pressure, adding the remaining part of the liquid to the suspension of high viscosity in that second drag flow pump and/or said pressure line for production of a suspension of low viscosity, and feeding that suspension of low viscosity to that process line.

The subject matter of the method according to the invention consists in that a suspension is produced by the use of—as the case may be—abrasive pulverulent solids, which is discharged under pressure and is supplied to a mixing device working under process pressure. The pressure build-up is to take place in such a way that a closed, continuously working system is achieved between the pressure build-up device and the mixing device. The process according to the invention has several advantages compared to the prior art: Due to its mixing effect the first drag flow pump produces the desired suspension of solids and liquids, builds up the necessary pressure and makes the formation of a material plug downstream this first pump possible. Since this first drag flow pump does not work with forced delivery it avoids too high a degree of wear due to abrasive solids. Besides its function for the pressure build-up the first drag flow pump serves as a continuous dosing device for the subsequent mixing device. The second drag flow pump works under process pressure and enables the formation of a suspension of comparatively high viscosity to be fed to the process line.

Further the invention relates to the use of an apparatus as described for building up the process pressure of a suspension being fed to a process line.

BRIEF DESCRIPTION OF THE DRAWINGS

The drawing is a circuit-diagrammatic view of one embodiment of an apparatus according to the invention.

DESCRIPTION OF A PREFERRED EMBODIMENT

The apparatus shown in the drawing comprises a first drag flow pump 1, which is constructed as an intermeshing co-rotating twin screw pump comprising a drive motor 2, a gear 3 and a feed casing 4 receiving the screws and which is carried by a bearing frame 5.

A second drag flow pump 6 is correspondingly constructed and has a drive motor 7, a gear 8 and a feed casing 9, which is carried by a support frame 10. The outlet 11 from the casing 4 is connected to the inlet 12 of the casing 9 of the second pump 6 via a pressure pipe 13 in which is provided a shut-off device 14.

An introduction device 15 for solids, an introduction device 16 for a liquid component, an introduction device 17 for a further solid, and an introduction device 18 for a further liquid component issue successively into the casing 4 of the pump 1. The introduction devices for the liquid components can comprise conventional pumps. The introduction devices for the supply and dosing of solids are also constructed in per se known manner and in each case essentially comprise a storage container 19, 20, a following conveyor-type weigher 21, 22 and an introduction connection 23, 24.

Alongside the outlet 11 at the end of the casing 4, a discharge line 25 is provided which can be shut-off by a shut-off device 26.

A further introduction device 27 for a liquid component leads to the pressure pipe 13 and to the casing 9 of the pump 6, into which also issues a return line 28. An outlet 29 from the casing 9 issues into a process line 30, which leads directly to a pressurized reaction or process chamber. The return line 28 ensures a return of the product delivered by the process line 30 if a product discharge is wholly or partly impossible as a result of faults.

In operation, the first pump 1 is supplied with solids by means of the introduction devices 15, 17 (e.g. abrasive powder, coal dust), whilst liquids (e.g. water, oil) are supplied by the introduction devices 16, 18. A dosed supply takes place in such a manner that there is a higher pressure $P_1$ at the outlet 11 of the casing 4 than the initial pressure $P_o$ at the start. This pressure $P_1$ at least corresponds to the process pressure, including pressure losses in the following units. By means of the pressure pipe 13, the suspension produced in the first pump 1 then passes into the casing 9 of the second pump 6, which is under process pressure. The residual liquid supplied by means of the introduction device 27 for achieving the desired viscosity and/or composition is either fed into the pressure pipe 13 via nozzles and/or into the casing 9 of the second pump 6. Two shut-off devices 31, 32 are provided for the corresponding distribution of this residual liquid in the manner shown in the drawing.

A suspension with a low viscosity and the necessary pressure is then available at the outlet 29 of the second pump 6. In the case of a fault, the shut-off device 14 can be closed, to prevent a return flow of gases.

The shut-off device 26 at the end of the casing 4 of the pump 1 is generally closed by it can be opened for emptying the casing 1 via the discharge line 25.

I claim:

1. Method for building up a process pressure in a process line leading to a pressurized reaction or process chamber in a suspension of low viscosity comprising at least one solid and one liquid to be fed to this process line comprising the feeding of said solid and a part of said liquid to a first drag flow pump, mixing said solid and said part of said liquid in said first drag flow pump to form a suspension of high viscosity, feeding that suspension of comparatively high viscosity, necessary for the formation of a material plug downstream of said first drag flow pump for the pressure build-up, to a pressure line downstream said first drag flow pump, the pressure of said suspension at the end of said first drag flow pump being as high or somewhat higher than the process pressure in the process line, conveying that suspension of comparatively high viscosity from that pressure line to a second drag flow pump, which is under process pressure, adding the remaining part of the liquid to the suspension of high viscosity in that second drag flow pump and/or said pressure line for production of a suspension of low viscosity, and feeding that suspension of low viscosity to that process line.

2. Method according to claim 1, comprising the shutting-off of a shut-off decive being arranged in the pressure line during start and stop phases of the feed of the suspension.

* * * * *